Patented Apr. 20, 1926.

1,581,436

UNITED STATES PATENT OFFICE.

HUGH A. GALT, OF AKRON, OHIO, ASSIGNOR TO PITTSBURGH PLATE GLASS COMPANY, A CORPORATION OF PENNSYLVANIA.

PROCESS OF PRODUCING COMMERCIAL HYDROCHLORIC ACID.

No Drawing.   Application filed March 23, 1923.   Serial No. 627,091.

*To all whom it may concern:*

Be it known that I, HUGH A. GALT, a citizen of the United States, and a resident of Akron, in the county of Summit and State of Ohio, have made a new and useful invention in Improvements in Processes of Producing Commercial Hydrochloric Acid, of which the following is a specification.

The invention relates to a process of utilizing a calcium chloride solution such as that produced in the practice of the process set forth in my Patent No. 1,249,739. Such a solution may be evaporated to produce commercial calcium chloride, but can be utilized to better advantage to produce material more desirable for the industries, such as, plaster of Paris, hydrochloric acid, liquid chlorine and bleaching powder, by following the procedure as hereinafter set forth.

In carrying out the process, the by-product utilized is the calcium chloride solution referred to above as produced by the waste lime mud recovery process of my Patent No. 1,249,739 which has a specific gravity of approximately 1.40, and contains approximately 40 per cent of calcium chloride. This liquor is treated with sulphuric acid ($H_2SO_4$) of such a degree of concentration that it will precipitate calcium sulphate with two molecules of water ($CaSO_4, 2H_2O$) together with hydrochloric acid (HCl), of the usual commercial concentration (18° Baumé). The solutions employed are relatively strong in order to get high test hydrochloric acid suitable for the manufacture of chlorine, and in order to get a proper and complete reaction, it is desirable that the mixture should stand from 24 to 36 hours. It is important that high test hydrochloric acid be produced by the reaction, as otherwise the acid would be of little or no value commercially, because of the impracticability of concentrating it to produce a salable product.

The mixture thus produced, consisting of calcium sulphate precipitate together with the hydrochloric acid, is then passed to a suitable mechanical filter where the acid is separated from the sulphate. This hydrochloric acid, is as above pointed out of the concentration ordinarily used in the manufacture of chlorine and is used in other arts and industries.

The calcium sulphate is now washed with water on a suitable filter, and is rendered practically acid free. Before such washing, this filtered sulphate will carry about 6 per cent of free hydrochloric acid. The calcium sulphate as thus washed may be either dried and marketed in this condition as a commercial product, or may be roasted in suitable furnace, where it loses 75 per cent of its water of crystallization, having the formula ($2CaSO_4, H_2O$), thus producing a highly desirable and marketable product, known as plaster of Paris.

The wash water resulting from the washing of the calcium sulphate containing the free acid and a small amount of calcium sulphate in solution from such sulphate is now employed in diluting commercial sulphuric acid to about 50° Baumé, for use in the original reaction, so that the hydrochloric acid and sulphate of calcium, which would otherwise be lost, is returned to the cycle of operation and utilized. The reactions as above recited are as follows:

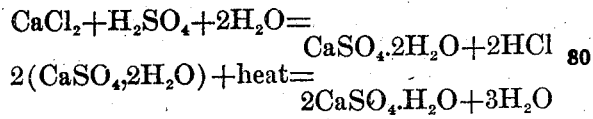

The hydrochloric acid as produced by the process is highly adapted for the production of chlorine by the Weldon process, for the manufacture of liquid chlorine, bleaching powder and other allied products, while the calcium sulphate may be utilized to advantage in producing plaster of Paris. This utilization of the calcium chloride is desirable, since the amount of calcium chloride available for manufacture as such is in excess of the demand and it is more profitable to utilize the calcium chlorid raw material to produce the products as above recited, including the plaster of Paris, the high test hydrochloric acid, liquid chlorine, bleaching powder, and the like. The advantage of the process, for the above reason, and because of the economy incident to the cycle of operations as recited, will be readily apparent to those skilled in the art. It is, of course, obvious that the calcium chlorid solution will vary in its percentage content of calcium chlorid. One of the important points of novelty in my invention is the use of a calcium chlorid solution which is strong enough to permit the direct production of concentrated commercial hydrochloric acid without the intermediate step of concentration.

What I claim is:

1. A process of producing commercial hydrochloric acid which consists in treating a solution of concentrated calcium chloride with sulphuric acid of such degree of concentration as to produce precipitated calcium sulphate and commercial concentrated hydrochloric acid, allowing the mixture to stand and react, and filtering off the acid.

2. A process of utilizing a concentrated solution of calcium chloride which consists in treating such solution with dilute sulphuric acid to produce precipitated calcium sulphate and commercial concentrated hydrochloric acid, filtering off the acid, washing the calcium sulphate with water, and utilizing the wash mixture consisting of water and hydrochloric acid thus obtained to dilute the sulphuric acid for use in the first step of the process as above recited and repeating the cycle.

3. A process of producing commercial hydrochloric acid which consists in treating a solution of calcium chlorid containing approximately 40 per cent of calcium chlorid with sulfuric acid of such degree of concentration as to produce precipitated calcium sulfate and commercial concentrated hydrochloric acid and recovering the calcium sulfate and the hydrochloric acid.

In testimony whereof, I have hereunto subscribed my name this 19th day of March, 1923.

HUGH A. GALT.